Patented Nov. 27, 1928.

1,692,900

UNITED STATES PATENT OFFICE.

ARTHUR LIEBRECHT, OF FRANKFORT-ON-THE-MAIN, GERMANY, ASSIGNOR TO THE FIRM CHEMISCH-PHARMAZEUTISCHE AKTIENGESELLSCHAFT BAD HOMBURG, OF BAD HOMBURG, GERMANY, A CORPORATION OF GERMANY.

BASIC QUININE SOLUTION.

No Drawing. Application filed January 17, 1928, Serial No. 247,450, and in Germany November 4, 1925.

This invention relates to a method for making therapeutically utilizable solutions of basic quinine.

The known quinine salt solutions, used for injections, often produce a strong irritation. Thus for example injections of quinine hydrochloride and urethane containing solutions are not only strongly painful but also produce often long lasting indurations and necrosis (comp. Berliner klinische Wochenschrift 58, 608).

According to the invention non-irritating, aqueous quinine solutions are made from the practically insoluble basic quinine. This is possible, when the basic quinine is dissolved in solutions of quinine salts preferably in presence of other substances increasing the solubility. One of these other substances, especially suitable for the purpose in question is phenyldimethylpyrazolone; other additional substances increasing the solubility are for example isovaleramide and other amides of aliphatic acids and the known substances such as urethanes facilitating the dissolving.

One of the main advantages, obtained according to the invention, is to be seen in the fact, that by the combined use of quinine salt and basic quinine aqueous quinine, solutions of a certain desired reaction may be prepared; for example solutions the reaction of which is exactly adapted to the reaction of the blood (pH=7.4) or of the texture (pH=7.2). Furthermore basic reacting solutions of quinine have, compared with neutral quinine salt solutions, a higher disinfecting power, which according to Michaelis (Klinische Wochenschrift, 1922, 231) depends upon the pH-value and increases with rising alkalinity.

*Examples.*

1. In a hot solution of 40 parts of quinine hydrochloride in 1000 parts of water are dissolved 1.5 parts of basic quinine. The obtained cool solution is clear and reacts alkaline. While the solution of quinine hydrochloride, showing a neutral reaction with litmus, has a pH-value=6.5 and is therefore acid, the solution obtained according to the example has the pH-value=7.4 corresponding to that of the blood.

2. In a hot solution of 80 parts of quinine formate in 1000 parts of water are dissolved 2 parts of basic quinine. The cool solution obtained is clear and reacts alkaline; its pH-value is 7.5.

3. In a hot solution of 80 parts of quinine lactate are dissolved 4 parts of basic quinine. The pH-value of the cool, clear and alkaline reacting solution is 7.7.

As already mentioned, the solubility of basic quinine in aqueous solutions of quinine salts may be increased by addition of substances facilitating the dissolution such as phenyldimethylpyrazolone, isovaleramide and the like. Thus for example a considerable amount of basic quinine may be dissolved in a concentrated aqueous solution of the difficultly soluble quinine hydrochloride, prepared by dissolving this salt in presence of just such an amount of additional substance increasing the solubility of the salt, as is necessary to keep the quinine salt in solution.

4. In a hot solution of 10 parts of isovaleramide and 10 parts of quinine hydrochloride in 90 parts of water is dissolved 1 part of basic quinine. The about 100 parts of cool solution obtained are filtered; the pH-value is 7.6.

When using phenyldimethylpyrazolone as substance for facilitating the dissolution of basic quinine in water, the use of quinine salt is not necessary. One thus obtains solutions containing only basic quinine material. The combined use of quinine and phenyldimethylpyrazolone has furthermore the advantage, that potentized therapeutic effects are produced, which has been proved for example by Bürgi (Medizinische klinische Wochenschrift, 1926, 22).

5. A solution containing in 100 parts of water 30 parts of phenyldimethylpyrazolone and 0.8 parts of basic quinine may be diluted with any amount of water, whereas for example a corresponding quinine solution containing urethane for increasing the solubility of the quinine material cannot be diluted with water, without producing a precipitate of quinine.

I claim:

1. A method for making basic solutions of quinine comprising the step of mixing basic quinine with a quinine salt in the presence of water.

2. A method for making therapeutically utilizable aqueous solutions of basic quinine comprising the step of dissolving the quinine base in a solution of quinine salt in presence of other substances increasing the solubility.

3. A method for making therapeutically utilizable aqueous solutions of basic quinine comprising the step of dissolving the quinine base in a solution of quinine salt under assistance of phenyldimethylpyrazolone.

4. A method for making therapeutically utilizable aqueous solutions of basic quinine comprising the step of dissolving the quinine base in presence of phenyldimethylpyrazolone.

5. As a new composition of matter an aqueous solution of basic quinine and quinine salt.

6. As a new composition of matter an aqueous solution of basic quinine, quinine salt and substances increasing the solubility of the quinine material.

7. As a new composition of matter an aqueous solution of basic quinine, quinine salt and phenyldimethylpyrazolone.

8. As a new composition of matter an aqueous solution of basic quinine and phenyldimethylpyrazolone.

In testimony whereof I affix my signature.

ARTHUR LIEBRECHT.